(12) United States Patent
Green et al.

(10) Patent No.: US 11,301,533 B1
(45) Date of Patent: Apr. 12, 2022

(54) SYSTEMS AND METHODS FOR RECOMMENDING PAGES

(71) Applicant: Meta Platforms, Inc., Menlo Park, CA (US)

(72) Inventors: Bradley Ray Green, Bellevue, WA (US); Vishal Vusirikala, Seattle, WA (US); Feng Wang, Redmond, WA (US); Komal Kapoor, Issaquah, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 448 days.

(21) Appl. No.: 16/234,488

(22) Filed: Dec. 27, 2018

(51) Int. Cl.
| | |
|---|---|
| *G06F 7/00* | (2006.01) |
| *G06F 16/9536* | (2019.01) |
| *G06F 16/9535* | (2019.01) |
| *G06N 5/04* | (2006.01) |
| *G06N 20/00* | (2019.01) |
| *G06F 16/2457* | (2019.01) |

(52) U.S. Cl.
CPC .... *G06F 16/9536* (2019.01); *G06F 16/24578* (2019.01); *G06F 16/9535* (2019.01); *G06N 5/04* (2013.01); *G06N 20/00* (2019.01)

(58) Field of Classification Search
CPC ............. G06F 16/9536; G06F 16/9535; G06F 16/24578; G06F 3/0482; G06F 16/285; G06F 2216/15; G06N 20/00; G06N 5/04; G06Q 30/0269; G06Q 30/0255; G06Q 30/0261
See application file for complete search history.

(56) References Cited

U.S. PATENT DOCUMENTS

| | | | | |
|---|---|---|---|---|
| 6,601,059 | B1 * | 7/2003 | Fries | G06F 16/951 |
| 2011/0145398 | A1 * | 6/2011 | Bansal | G06Q 30/06 709/224 |
| 2013/0007238 | A1 * | 1/2013 | Sandholm | G06F 16/9537 709/223 |
| 2018/0285730 | A1 * | 10/2018 | Zhao | G06N 5/022 |
| 2018/0300324 | A1 * | 10/2018 | Ziraknejad | G06N 20/00 |

* cited by examiner

*Primary Examiner* — Azam M Cheema
(74) *Attorney, Agent, or Firm* — Sheppard Mullin Richter & Hampton LLP

(57) ABSTRACT

Systems, methods, and non-transitory computer-readable media can be configured to determine a page embedding for each page in a sequence of pages visited by a user. A pooled page embedding can be determined based on the page embeddings for the sequence of pages visited by the user. One or more page recommendations for the user can be determined based at least in part on the pooled page embedding.

20 Claims, 8 Drawing Sheets

SYSTEMS AND METHODS FOR RECOMMENDING PAGES

FIELD OF THE INVENTION

The present technology relates to the field of content provisioning in a computer networking environment. More particularly, the present technology relates to techniques for recommending pages in a computer networking environment.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others.

SUMMARY

Various embodiments of the present technology can include systems, methods, and non-transitory computer readable media configured to determine a page embedding for each page in a sequence of pages visited by a user. A pooled page embedding can be determined based on the page embeddings for the sequence of pages visited by the user. One or more page recommendations for the user can be determined based at least in part on the pooled page embedding.

In some embodiments, a user embedding can be determined for the user. The one or more page recommendations can be further based at least in part on the user embedding.

In some embodiments, a set of candidate pages can be determined based at least in part on the pooled page embedding. The set of candidate pages can be ranked based at least in part on the pooled page embedding or the user embedding.

In some embodiments, a set of candidate pages can be determined by determining a candidate page embedding for each candidate page in the set of candidate pages. A proximity between each candidate page embedding and the pooled page embedding can be evaluated. The set of candidate pages can be determined further based at least in part on whether the candidate page embedding is within a threshold proximity of the pooled page embedding.

In some embodiments, the user embedding can be based at least in part on user features associated with the user.

In some embodiments, a set of candidate page actions can be determined. The set of candidate page actions can be ranked based at least in part on the pooled page embedding or the user embedding.

In some embodiments, a trending topic can be determined based at least in part on a plurality of sequences of pages visited by a plurality of users. The one or more page recommendations can be further based at least in part on the trending topic.

In some embodiments, the trending topic can be included in a set of trending topics. A trending prevalence can be determined for each trending topic in the set of trending topics. The one or more page recommendations can be further based at least in part on each trending prevalence.

In some embodiments, the page embedding for each page can be based at least in part on page features associated with each page.

In some embodiments, the page recommendation can be determined by training a machine learning model based at least in part on each training page embedding in a plurality of training sequences of pages. A pooled page embedding can be determined based at least in part on the sequence of pages, each page embedding, and the machine learning model.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
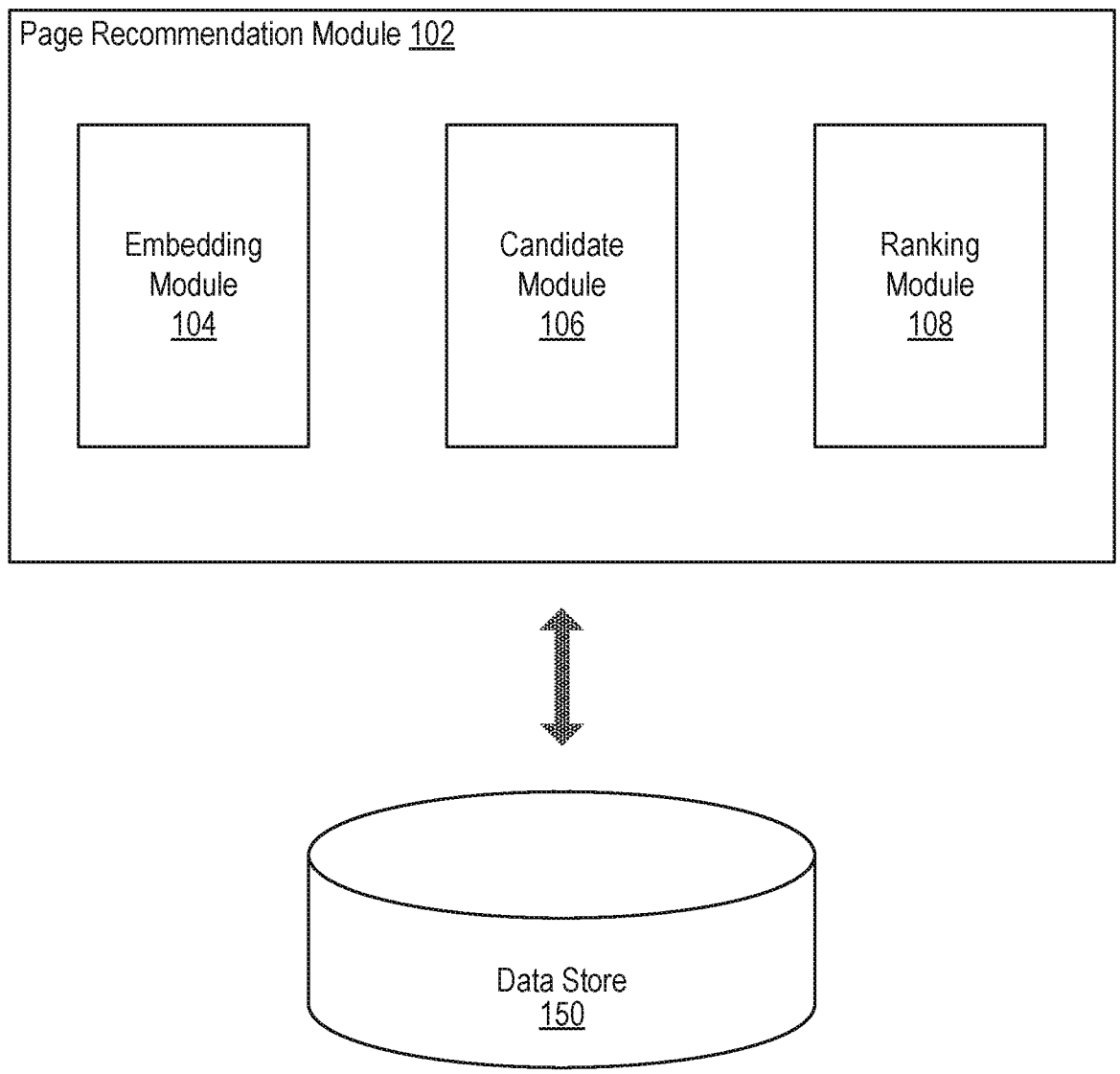
FIG. 1 illustrates an example system including an example page recommendation module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Recommending Pages

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others.

Under conventional approaches, a user can navigate to various pages accessible through a social network (or social networking system) and can access a variety of content items shared through the various pages. As the user navigates the various pages, the user may find some pages to be interesting and may wish to view additional pages that are similarly interesting. The social networking system could keep the user engaged as well as enhance the overall user experience by providing such additional pages. However, under conventional approaches, identifying pages that the user is likely to find interesting presents significant challenges. Further, as the number of pages available on the social networking system continues to grow, so too does the challenge of identifying pages that the user is likely to find interesting. Accordingly, conventional approaches for identifying pages of interest can be ineffective and unable to scale as the number of pages available through the social networking system continues to increase. Thus, such conventional approaches are not effective in addressing these and other problems arising in computer technology.

An improved approach rooted in computer technology overcomes the foregoing and other disadvantages associated with conventional approaches specifically arising in the realm of computer technology. In various embodiments, the present technology can determine page recommendations for a given user based on a sequence of pages visited by the user, for example, during a given session. In general, a page may relate to a topic and can provide access to posts and content items that are published through the page. The page may also be associated with a variety of page features that provide information such as a timestamp of when the page was created, a timestamp of when the page was last updated, and a number of posts published through the page, to name some examples. Similarly, a user may be described by a variety of user features such as user id, age, geographic location, interests, social connections, and past activity, to name some examples. In various embodiments, one or more trained machine learning models can be used to determine embeddings for pages and embeddings for users. For example, a trained machine learning model can generate a page embedding for a page based on page features associated with that page. In some embodiments, a page embedding can be a numerical representation (e.g., a vector) of a page. A separate trained machine learning model can generate a user embedding for a user based on user features associated with the user. The user embedding can be a numerical representation (e.g., a vector) of the user. In various embodiments, such page embeddings and user embeddings can be used to generate page recommendations for users. For example, page embeddings of pages visited by a user in a sequence (or during a session) can be pooled to determine a pooled page embedding. The pooled page embedding can be mapped in a vector space along with page embeddings of potential candidate pages. Based on a nearest neighbor algorithm, one or more candidate pages that have a respective page embedding within a threshold level proximity to the pooled page embedding can be identified. The identified candidate pages can be ranked, based on a respective user embedding of the user, and some or all of the ranked candidate pages can be provided as page recommendations to the user. The user embedding for the user can be used to rank the identified candidate pages based on user features associated with the user (e.g., user id, age, geographic location, interests, social connections, and past activity). Additional details relating to the present technology are provided below.

FIG. 1 illustrates an example system 100 including an example page recommendation module 102, according to an embodiment of the present technology. As shown in the example of FIG. 1, the page recommendation module 102 can include an embedding module 104, a candidate module 106, and a ranking module 108. In some embodiments, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details.

In some embodiments, the page recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some embodiments, the page recommendation module 102 can be implemented, in part or in whole, as software running on one or more computing devices or systems, such as on a user or client computing device. In one example, the page recommendation module 102, or at least a portion thereof, can be implemented as or within an application (e.g., app), a program, or an applet, etc., running on a user computing device or a client computing system, such as the user device 610 of FIG. 6. In another example, the page recommendation module 102 or at least a portion thereof can be implemented using one or more computing devices or systems that include one or more servers, such as network servers or cloud servers. In some embodiments, the page recommendation module 102 can, in part or in whole, be implemented within or configured to operate in conjunction with a social networking system (or service), such as the social networking system 630 of FIG. 6.

The page recommendation module 102 can be configured to communicate and/or operate with the at least one data store 150, as shown in the example system 100. The at least one data store 150 can be configured to store and maintain various types of data including, for example, the respective page features of pages visited by users, respective user features of the users, and information describing sequences of pages visited by the users. In some implementations, the at least one data store 150 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 150 can store information associated with users, such as user identifiers, user information, profile information, user specified settings, content produced or posted by users, and various other types of user data.

In various embodiments, the embedding module 104 can determine embeddings for pages and embeddings for users. For example, a page embedding for a page can be determined based on page features associated with the page. In this example, the page embedding can be a numerical (or vector-based) representation of the page features that describe the page. Similarly, a user embedding for a user can be determined based on user features associated with the user. The user embedding can be a numerical (or vector-based) representation of the user features that describe the user. In various embodiments, embeddings can be used to determine various interrelationships between different sets of information. In general, page embeddings can be used to determine a pooled page embedding, and user embeddings can be used to rank candidate pages to provide page recommendations. More details regarding the embedding module 104 will be provided below with reference to FIG. 2.

In various embodiments, the candidate module 106 can generate a pooled page embedding from page embeddings determined by the embedding module 104. These page embeddings may correspond to a sequence of pages visited by a user during a given session. In this example, the pooled page embedding can be used to determine a set of candidate pages that are similar to the pages that were visited by the user. In various embodiments, one or more of the candidate pages can be provided as page recommendations, as described below. More details regarding the candidate module 106 will be provided below with reference to FIG. 3.

In various embodiments, the ranking module 108 can rank a set of candidate pages. For example, the set of candidate pages can be determined by the candidate module 106. The ranking module 108 can rank the set of candidate pages based on a user embedding for a user for whom a page recommendation is being generated. The user embedding can be determined by the embedding module 104. For example, a user may visit a sequence of pages related to do-it-yourself home improvement. In this example, page embeddings for the pages can be pooled to generate a pooled page embedding. The pooled page embedding can be used to determine a set of candidate pages. The set of candidate pages can be ranked based on a user embedding of the user. In this example, the user embedding may indicate that the user has a preference for local businesses. Accordingly, a page for a local home improvement store near the user's location may be ranked higher than pages for other businesses that are farther away from the user's location. In some embodiments, the page for the local home improvement store can be provided as a page recommendation to the user. More details regarding the ranking module 108 will be provided below with reference to FIG. 4.

Figure 2:
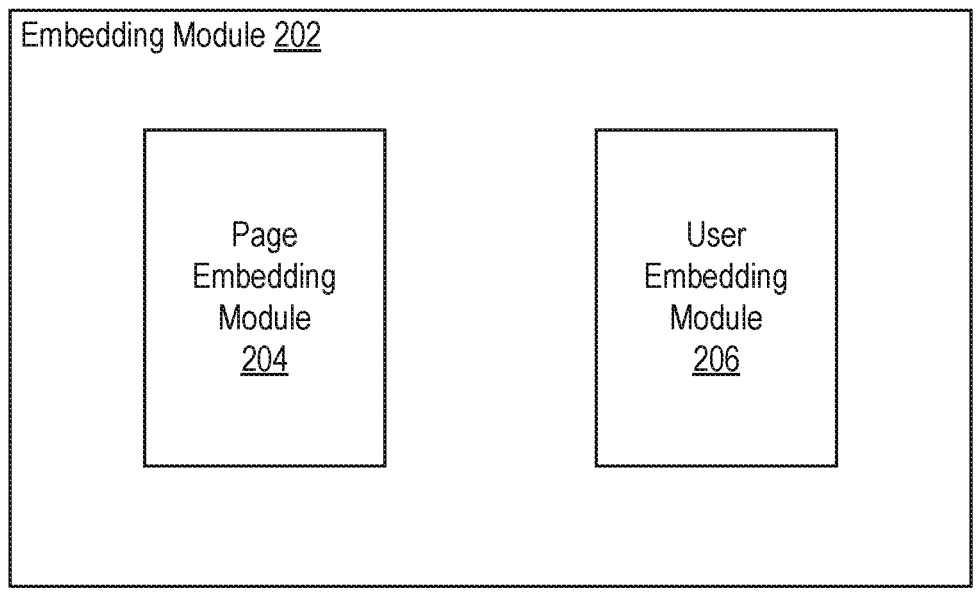
FIG. 2 illustrates an example of an embedding module, according to an embodiment of the present technology.

FIG. 2 illustrates an example of an embedding module 202 configured to generate embeddings for pages and users, according to an embodiment of the present technology. In some embodiments, the embedding module 104 of FIG. 1 can be implemented as the embedding module 202. As shown in FIG. 2, the embedding module 202 can include a page embedding module 204 and a user embedding module 206.

The page embedding module 204 can determine a page embedding for a page based on a set of page features associated with the page. In general, page embeddings for multiple pages can be pooled to determine a pooled page embedding. In various embodiments, the page embedding module 204 can generate such page embeddings using a machine learning model. For example, the machine learning model can be trained to output a page embedding (e.g., numerical or vector-based representation) for a page based on a set of page features of the page. In various embodiments, page features of a page can include one or more topics (e.g., user, group, business, product, service, location, interest associated with the page), an author (e.g., user or entity who created the page), a creation timestamp (i.e., when the page was created), a last updated timestamp (i.e., when the page was last updated), a number of posts published through the page, a frequency of posts (or how often posts are published), a timestamp corresponding to a most recent post, a number of comments published through the page, a frequency of comments, a timestamp corresponding to a most recent comment associated with the page, a frequency of responses to comments (or how often responses to comments are published), and co-visitation information identifying other pages that users visited or "fanned" (e.g., liked) in addition to the page, to name some examples. For example, a restaurant owner may create a page to promote a restaurant. In this example, page features for the page may identify restaurant cuisine, location, and business hours. The page features may also indicate how often a page administrator posts content to the page and how often the page administrator responds to user comments on the page. Additional page features may also include ratings or reviews of the restaurant and co-visitation information. These page features can serve as a basis for determining a page embedding for the page. In some embodiments, the machine learning model used to generate page embeddings can be retrained based on new or updated training data. For example, the new or updated training data may include training examples corresponding to new pages and their respective page features. In another example, the new or updated training data may include training examples corresponding to existing pages and their updated page features. Many variations are possible.

The user embedding module 206 can determine a user embedding for a user based on a set of user features associated with the user. In general, a user embedding can be a basis for ranking candidate pages to generate a page recommendation for a user. In various embodiments, the user embedding module 206 can generate such user embeddings using a machine learning model. For example, the machine learning model can be trained to output a user embedding (e.g., numerical or vector-based representation) for a user based on a set of user features corresponding to the user. In various embodiments, user features for a user can include age, age group, gender, geographic location (e.g., country, state, county, city, etc.), interests (e.g., topics in which the user has expressed interest, pages the user has "fanned" or "liked"), comments posted on pages, and how often the user posts comments, to name some examples. In some embodiments, the machine learning model used to generate user embeddings can be retrained based on new or updated training data. For example, the new or updated training data may include training examples corresponding to new users and their respective user features. In another example, the new or updated training data may include training examples corresponding to existing users and their updated user features. Many variations are possible. In general, user embeddings can provide a numerical representation of user preferences. Such user embeddings can offer insights into types of pages preferred by users and how those users prefer to interact with the pages. For example, a user embedding for a user who frequently posts comments on pages can indicate that the user is more likely to be interested in a page that has a large number of other user comments or a page that has a large number of responses to user comments. In another example, a user embedding for a user who frequently "fans" or "likes" pages corresponding to businesses in a certain area within a threshold proximity of where the user is located may indicate that the user enjoys supporting local businesses. In some embodiments, a user embedding for a user can be used to rank pages that may be recommended to the user. For example, the user embedding can be a vector-based representation of features associated with the user. These features can indicate page categories that are of interest to the user. The pages to be ranked can each be associated with a corresponding page embedding. Each page embedding can be a vector-based representation of features associated with the page including categories associated with the page. In some embodiments, a respective similarity between a page and the user can be determined based on a number of matches between the page categories that are of interest to the user and respective categories associated with each page. In some embodiments, pages can be ranked based on this similarity. For example, a first page that is associated with six categories that are of interest to the user can be ranked higher than a second page that is associated with two categories that are of interest to the user. Many variations are possible.

Figure 3A:
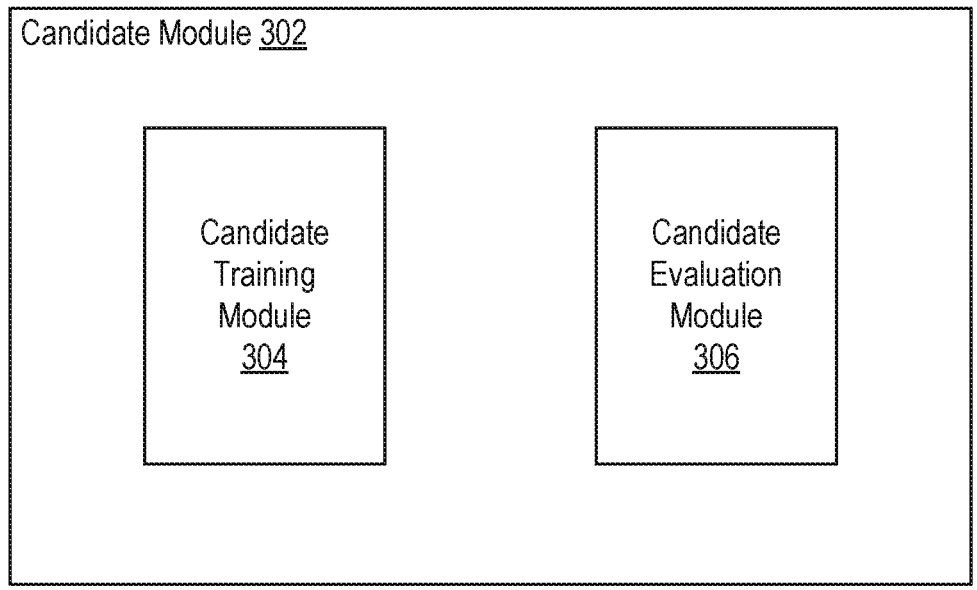
FIG. 3A illustrates an example of a candidate module, according to an embodiment of the present technology.

FIG. 3A illustrates an example of a candidate module 302 configured to determine candidate pages for generating page recommendations, according to an embodiment of the present technology. In some embodiments, the candidate module 106 of FIG. 1 can be implemented as the candidate module 302. As shown in FIG. 3A, the candidate module 302 can include a candidate training module 304 and a candidate evaluation module 306.

In various embodiments, the candidate module 302 can be configured to generate respective pooled page embeddings from page embeddings corresponding to sequences of pages visited by users. Such pooled page embeddings can be used to determine candidate pages that may be provided as recommendations to users. For example, as a user visits pages in a session, a respective page embedding for each page visited by the user can be pooled to generate a pooled page embedding. In general, pooling page embeddings involves applying weights to individual page embeddings of pages visited by the user. The application of such weights can adjust an amount of influence a given page embedding has on the pooled page embedding. For example, applying weights to an individual page embedding for a page can weigh some page features for the page more heavily than other page features. Various factors may affect the weights applied to a page embedding for a page. In some embodiments, a page embedding for a page may be weighted based on a position of the page within in a sequence of pages visited by a user. For example, the page embedding for the most recently visited page in a given session can be weighted more heavily and thus have a greater influence on a resulting pooled page embedding. In some embodiments, page embeddings for pages visited earlier in a session can be weighted less heavily and thus have a lesser influence on a resulting pooled page embedding. Additional factors that can influence the weighting of page embeddings include visit times (e.g., when a page was visited), interval times (e.g., how long between page visits), and visitation duration (e.g., how long a page was visited). For example, a user may visit a page briefly before visiting another page where the user spends relatively more time. The relatively short visitation duration of the briefly visited page may indicate that the user was not interested in the page. Accordingly, the page embedding for the briefly visited page may be less heavily weighted and have a lesser influence on a resulting pooled embedding. In some embodiments, the candidate module 302 can generate pooled page embeddings based on a recurrent neural network (e.g., a long-short term memory (LSTM)). For example, the recurrent neural network can be trained using information describing sequences of pages visited by users.

In various embodiments, the candidate module 302 can segment (e.g., aggregate or divide) sequences of pages visited by a user into sessions. In such embodiments, pooled page embeddings can be generated from page embeddings of pages visited during a given session. In general, a session refers to a set of sequentially visited pages and a session length refers to a total number of pages in the set of sequentially visited pages. For example, a user's most recent session with a session length of one hundred can refer to one hundred pages visited most recently by the user. In some embodiments, session lengths are variable. For example, a user searching for a place to eat lunch may visit a number of pages for nearby restaurants. In this example, the user's session may span a short amount of time and the session length may be a relatively small number of pages. In another example, a user planning a vacation may visit many pages related to traveling. In this example, the user's session may span several days and the session length may be a relatively large number of pages. In some embodiments, session length can be configurable or selected by, for example, an administrator of a computing system implementing the page recommendation module 102. In some embodiments, an upper limit can be set for session lengths. For example, an upper limit of one hundred pages can be set based upon a determination that session lengths longer than one hundred pages reduce the overall relevancy or effectiveness of a session. In other embodiments, there is no upper limit for session lengths. For example, a session can include every page a user has visited.

The candidate training module 304 can train a machine learning model (e.g., recurrent neural network) to generate pooled page embeddings. In some embodiments, training data for training the machine learning model can include pages visited in some sequence by users during their respective sessions. Each page visited by a user can be identified with a page identifier (ID). Further, each page can be associated with a corresponding page embedding that has been determined, for example, by the page embedding module 204, as described above. Similarly, each user can be identified with a user identifier (ID). Further, each user can be associated with a user embedding that has been determined, for example, by the user embedding module 206, as described above. Accordingly, the training data can describe pages visited by users over many sessions and respective page embeddings of the visited pages. Additionally, training data for training the machine learning model can include visit times (e.g., when a page was visited), interval times (e.g., an elapsed time between page visits), and visitation duration (e.g., a duration over which a page was accessed). The candidate training module 304 can retrain the machine learning model based on new or updated training data. Further, as users continue to visit pages, new or updated sequences of pages visited can be utilized as training data. Accordingly, as new or updated page embeddings, user embeddings, and sessions of visited pages are provided, the candidate training module 304 can continually retrain the machine learning model.

The candidate evaluation module 306 can apply the trained machine learning model to generate pooled page embeddings. In some embodiments, the trained machine learning model can accept, as input, information describing a sequence of pages visited by a user during a given session (e.g., page embeddings for each of the pages). The trained machine learning model can process these inputs to provide a pooled page embedding as output. For example, a user can visit a variety of pages describing famous landmarks in San Francisco, Calif. during a given session. In this example, the trained machine learning model can be provided page embeddings of the visited pages and a user embedding for the user as inputs. The trained machine learning model can generate a pooled page embedding based on the inputs provided. For example, as the user visits pages, a respective page embedding for each page visited by the user can be pooled by the trained machine learning model. In general, pooling page embeddings refers to applying weights to input page embeddings, which can adjust their influence on the outputted pooled page embedding. As discussed above, various factors may affect the weights applied to an input page embedding, such as a position of the respective page within a sequence of visited pages. In the foregoing example, based on visitation of the pages describing famous landmarks in San Francisco, a determination can be made that the user is planning a trip to San Francisco, Calif. In this example, the trained machine learning model can output a pooled page embedding that can be used to determine a set of candidate pages that offer content that is likely to be of interest to the user, such as options to purchase a flight ticket, book a hotel, or other pages related to San Francisco. In various embodiments, candidate pages can be determined using a nearest neighbor algorithm. For example, the set of candidate pages determined for the user planning a trip to San Francisco, Calif. can be determined by mapping the outputted pooled page embedding in a vector space. Further, page embeddings for some or all pages that are accessible through the social networking system are also mapped in the vector space. In this example, page embeddings that are mapped to positions within a threshold proximity (or distance) of the mapped pooled page embedding can be identified as candidate pages.

In various embodiments, the approaches described herein can be used to identify trending topics, pages, or content. For example, based on visitation patterns determined from sessions of pages visited by users, a determination can be made that a certain topic is trending. As described above, a topic of a page can be described in a page embedding of the page. Accordingly, the candidate evaluation module 306 can identify pages that are trending or are likely to trend based on a determination that a certain topic is trending. For example, based on a number of sessions of pages visited by users, it may be determined that a certain meme is a trending topic. Because the meme is a trending topic, it may be determined that pages that include or reference the meme are trending pages or are likely to be trending pages. If a user visits a variety of pages depicting different memes, a session of the pages the user visits may indicate that the user is interested in trending memes. Accordingly, the machine learning model can output a pooled page embedding that can be used to determine a set of candidate pages that contain the trending meme. In some embodiments, multiple topics may be trending. A weight can be applied to a trending topic based on its trending prevalence. For example, users may be sharing pages containing a first trending topic more often than they are sharing pages containing a second trending topic. In this example, the first trending topic may be determined to have a higher trending prevalence than the second trending topic and, accordingly, weighted more heavily. Thus, if a user is searching for trending topics, the approaches described above can determine a set of candidate pages that can be ranked to generate a recommendation for a page related to a trending topic.

Figure 3B:
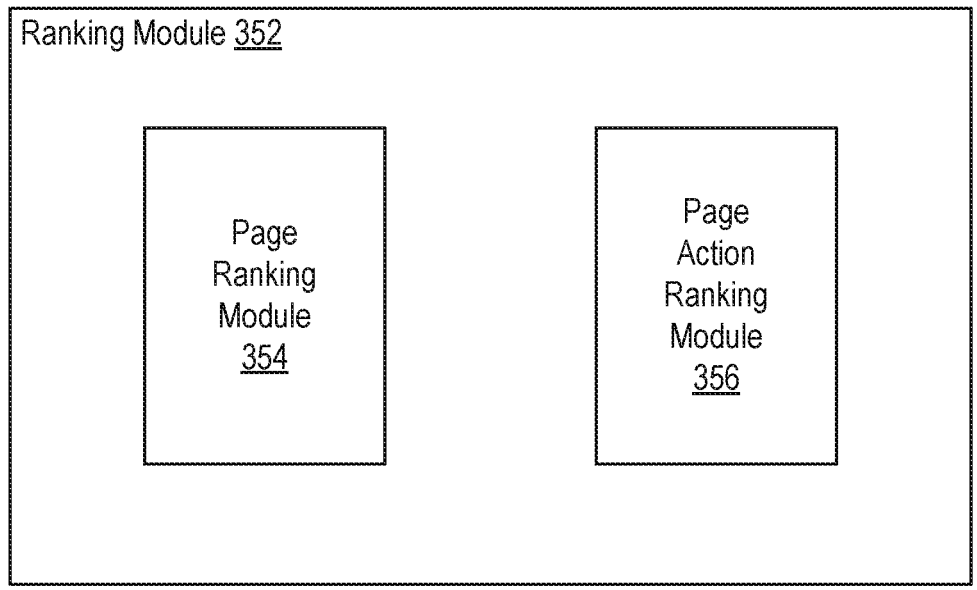
FIG. 3B illustrates an example of a ranking module, according to an embodiment of the present technology.

FIG. 3B illustrates an example of a ranking module 352 configured to rank a set of candidate pages for purposes of generating page recommendations, according to an embodiment of the present technology. In some embodiments, each candidate page can be associated with a corresponding percentage that indicates a likelihood of a given user accessing the candidate page in response to a page recommendation. Such likelihoods can be used to rank the candidate pages for the user. In various embodiments, the ranking module 352 can also be configured to determine and rank a set of page actions that a user is likely to perform. In some embodiments, each page action can be associated with a corresponding percentage that indicates a likelihood of a given user performing the page action. Such likelihoods can be used to rank the page actions for the user. In some embodiments, the ranking module 108 of FIG. 1 can be implemented as the ranking module 352. As shown in FIG. 3B, the ranking module 352 can include a page ranking module 354 and a page action ranking module 356.

The page ranking module 354 is configured to rank a set of candidate pages to generate a page recommendation. In general, a set of candidate pages can be ranked based on a likelihood that a user will be interested in a candidate page. A likelihood that a user will be interested in a candidate page can be based on various factors, such as user preferences, time, or location. User-related factors such as user preferences or location can be encapsulated in a user embedding, and a ranking of candidate pages generated for a user can be based on a respective user embedding for the user, as described above. For example, a user may be visiting pages while searching for a gift. A set of candidate pages can be generated based on the pages the user visits. Based on a user embedding of the user, which may describe user features such as the user's location and the user's preference for independently owned businesses, the set of candidate pages can be ranked such that the highest ranked candidate pages include pages for independently owned businesses that are located near the user and that sell gifts. Other approaches for ranking candidate pages are contemplated. For example, in some embodiments, a ranking of candidate pages can be based in part on a time a user is visiting pages. For example, a user may be visiting pages while searching for trending topics. A set of candidate pages that contain trending content can be generated for the user. Based on a time and location of the user, the set of candidate pages can be ranked such that the highest ranked candidate pages include pages for the topics that are currently trending near where the user is located. In some embodiments, a set of candidate pages can be ranked, alternatively or further, based on the relative proximity of their respective page embeddings to a pooled page embedding. For example, a nearest neighbor algorithm can be applied to a set of candidate pages to determine which candidate pages have a respective page embedding that is within a threshold distance of a pooled page embedding. The set of candidate pages can be ranked based on a relative proximity (or distance) between their respective page embeddings and the pooled page embedding. In this example, the highest ranked candidate page has a respective page embedding that is closest to the pooled page embedding. Many variations are possible.

The page action ranking module 356 is configured to determine and rank a set of candidate page actions. For example, the ranked candidate page actions can be used to predict what a user is likely to do or to generate a page action recommendation. The page action ranking module 356 can determine and rank a set of candidate page actions for a user based on a user embedding for the user, as described above. For example, a user may regularly comment on pages that are visited by the user. This propensity for commenting may be reflected in the user embedding corresponding to the user. In some embodiments, when the user is provided with a page recommendation, such as one generated by the page ranking module 354, an additional determination can be made that the user is likely to comment on the recommended page. Accordingly, a set of candidate page actions can be ranked such that the highest ranked page action indicates that the user is likely to comment on the recommended page. Page actions can include "fanning" (e.g., selecting a "fan" option) a page, "liking" (e.g., selecting a "like" option) a page, sharing a page, posting a comment on the page, buying a product sold on a page, and contacting a page author through a page, to name some examples. In some embodiments, a page action that a user is predicted to perform can be presented as a page action recommendation.

Figure 4:
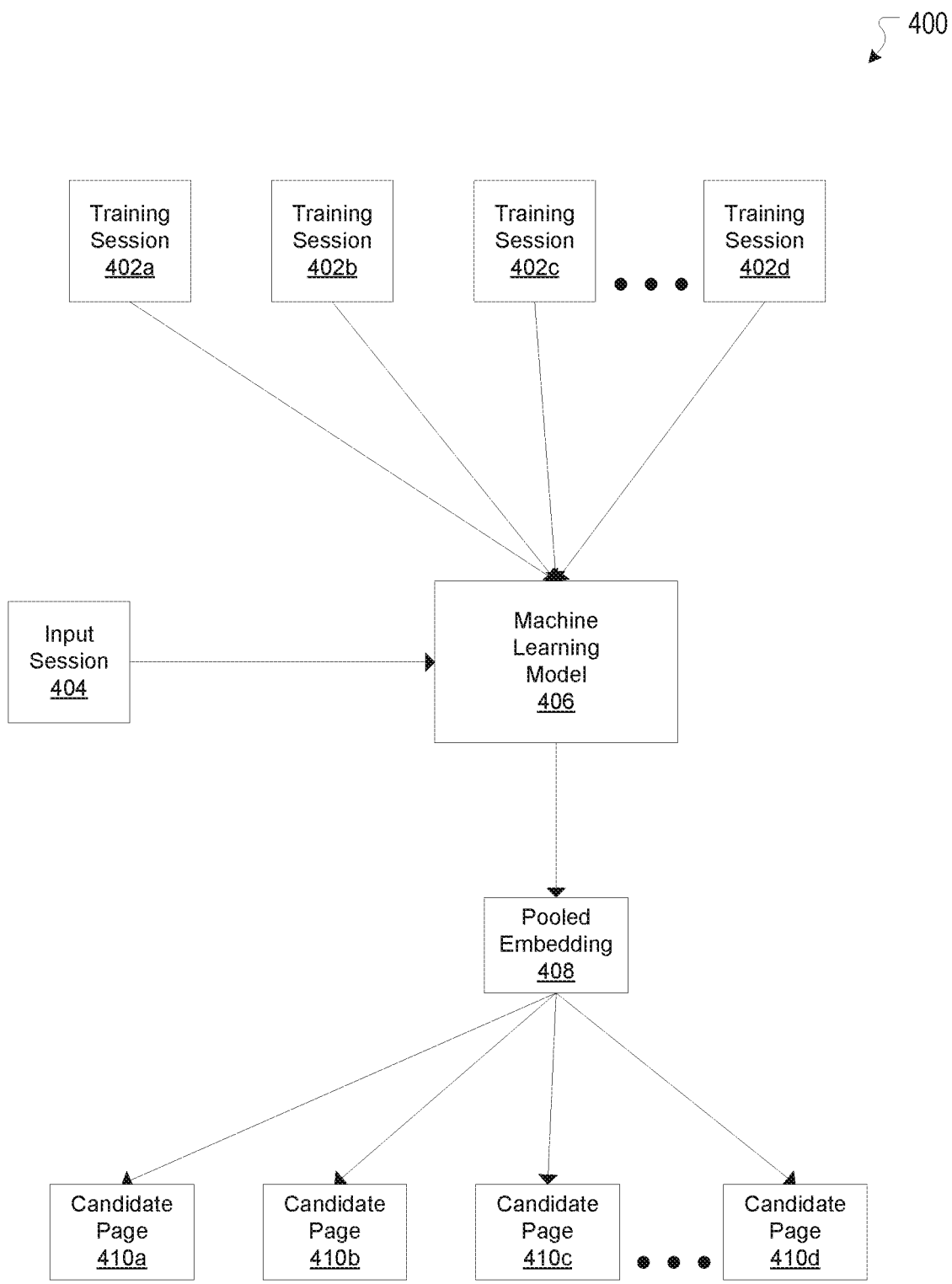
FIG. 4 illustrates an example functional block diagram, according to an embodiment of the present technology.

FIG. 4 illustrates an example functional block diagram 400 for determining a set of candidate pages, according to an embodiment of the present technology. Various functionalities associated with the functional block diagram 400 can be performed by the page recommendation module 102, as described above. The machine learning model 406 can be trained to generate a pooled page embedding 408 from which a set of candidate pages 410a-d can be generated and, subsequently, ranked to generate a page recommendation. Training sessions 402a-d, which can be sessions of pages users have visited, are provided to the machine learning model 406 as training data. The training sessions 402a-d can include page embeddings of each page in the sessions of pages users have visited. The page embeddings can be generated based on page features of their respective pages, as described above. The machine learning model 406 can be trained and retrained with new or updated training data, such as training sessions 402a-d. An input session 404, which can comprise a session of pages a user has visited, is provided to the machine learning model 406. Applying the machine learning model 406 to the input session 404 can generate a pooled page embedding 408 as output. Based on the pooled page embedding 408, a set of candidate pages 410a-d can be determined. The set of candidate pages 410a-d can be generated, for example, using a nearest neighbor approach based on the pooled page embedding 408. The set of candidate pages 410a-d can be used to generate a page recommendation to the user. The set of candidate pages 410a-d can be ranked, for example, based on a respective user embedding for the user, and the highest ranking candidate page can be the page recommendation. All examples herein are provided for illustrative purposes, and there can be many variations and other possibilities.

Figure 5:
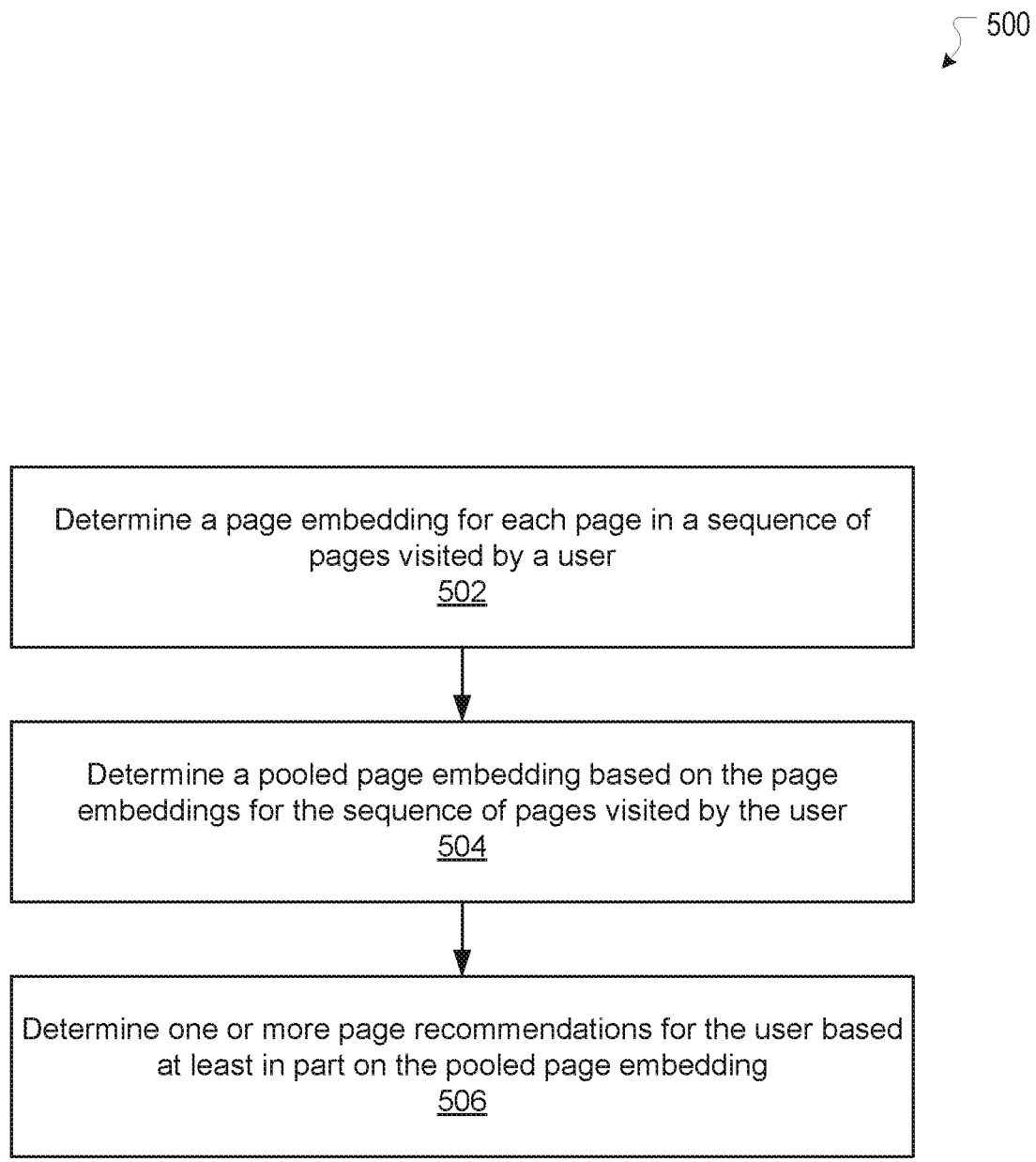
FIG. 5 illustrates an example process for determining a page recommendation, according to an embodiment of the present technology.

FIG. 5 illustrates an example method 500 for determining a page recommendation, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 determines a page embedding for each page in a sequence of pages visited by a user. The page embedding can be determined, for example, by the embedding module 202, as described above. At block 504, the example method 500 determines a pooled page embedding based on the page embeddings for the sequence of pages visited by the user. The pooled page embedding can be determined, for example, by the candidate module 302, as described above. At block 506, the example method 500 determines a page recommendation based at least in part on the pooled page embedding. The page recommendation can be determined, for example, by the ranking module 352, as described above.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
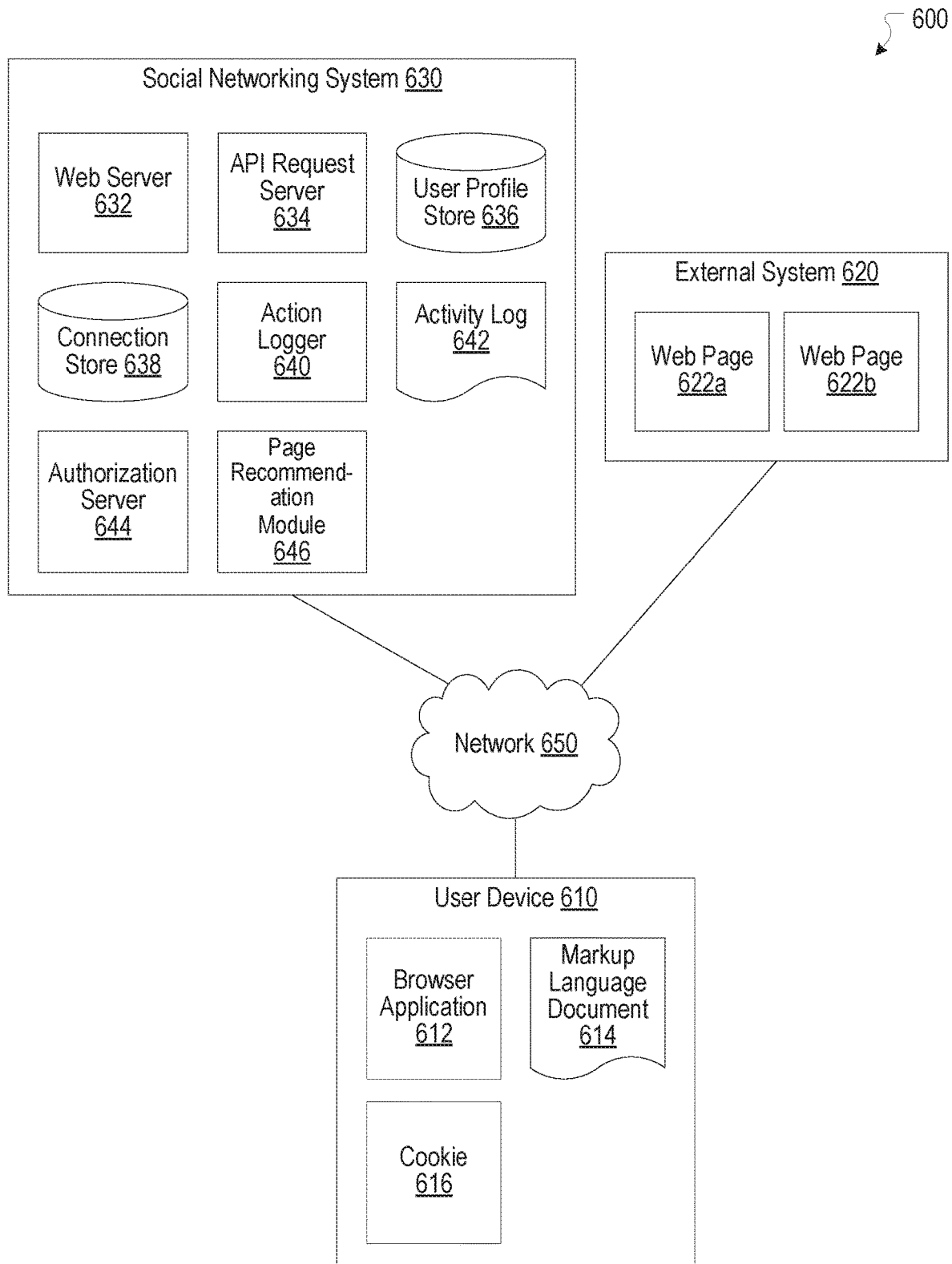
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects another user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page recommendation module 646. The page recommendation module 646, for example, can be implemented as some or all of the functionality of the page recommendation module 102 of FIG. 1. In some embodiments, some or all of the functionality of the page recommendation module 646 can be implemented in the user device 610. As discussed previously, it should be appreciated that there can be many variations or other possibilities.

Hardware Implementation

Figure 7:
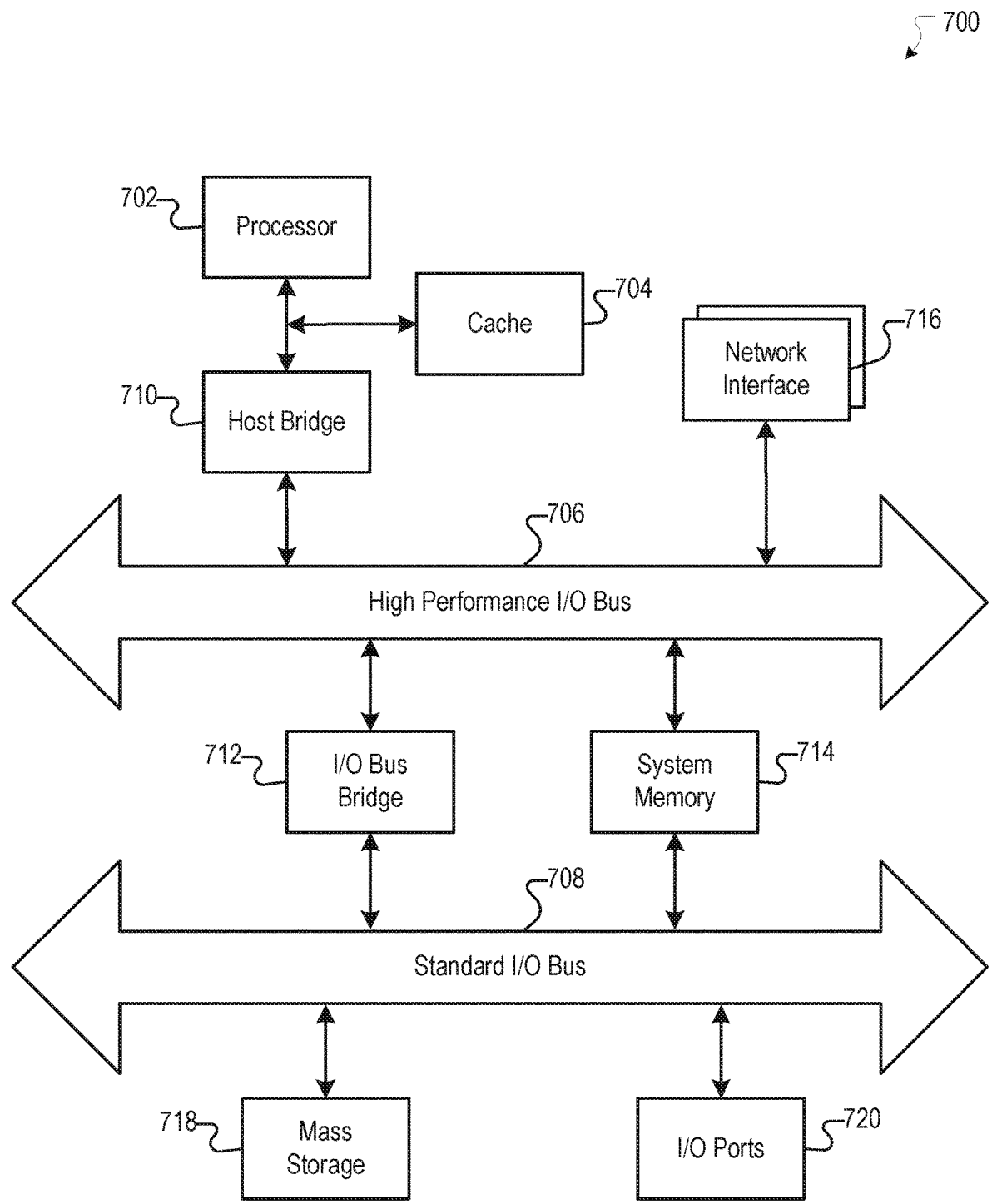
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the embodiments of the invention are intended to be illustrative, but not limiting, of the scope of the invention, which is set forth in the following claims.

What is claimed is:

1. A computer-implemented method comprising:
    determining, by a computing system, page embeddings for pages in a sequence of pages visited by a user;
    utilizing, by the computing system, a machine learning model to generate a pooled page embedding based on the page embeddings for the sequence of pages visited by the user, the machine learning model trained with training data including pages visited by users during their respective sessions; and
    determining, by the computing system, one or more page recommendations for the user based at least in part on the pooled page embedding.

2. The computer-implemented method of claim 1, further comprising:
    determining, by the computing system, a user embedding for the user; and
    wherein the one or more page recommendations are further based at least in part on the user embedding.

3. The computer-implemented method of claim 2, further comprising:
    determining, by the computing system, a set of candidate pages based at least in part on the pooled page embedding; and
    ranking, by the computing system, the set of candidate pages based at least in part on the pooled page embedding or the user embedding.

4. The computer-implemented method of claim 3, wherein the determining a set of candidate pages comprises:
    determining, by the computing system, a candidate page embedding for each candidate page in the set of candidate pages;
    evaluating, by the computing system, a proximity between each candidate page embedding and the pooled page embedding; and
    wherein the determining a set of candidate pages is further based at least in part on whether the candidate page embedding is within a threshold proximity of the pooled page embedding.

5. The computer-implemented method of claim 2, wherein the user embedding is based at least in part on user features associated with the user.

6. The computer-implemented method of claim 2, further comprising:
    determining, by the computing system, a set of candidate page actions; and
    ranking, by the computing system, the set of candidate page actions based at least in part on the pooled page embedding or the user embedding.

7. The computer-implemented method of claim 1, further comprising:
    determining, by the computing system, a trending topic based at least in part on a plurality of sequences of pages visited by a plurality of users; and
    wherein the one or more page recommendations are further based at least in part on the trending topic.

8. The computer-implemented method of claim 7, wherein the trending topic is included in a set of trending topics, further comprising:
    determining, by the computing system, a trending prevalence for each trending topic in the set of trending topics; and
    wherein the one or more page recommendations are further based at least in part on each trending prevalence.

9. The computer-implemented method of claim 1, wherein the page embedding for each page is based at least in part on page features associated with the page.

10. The computer-implemented method of claim 1, wherein the determining a pooled page embedding comprises:
- training, by the computing system, the machine learning model based at least in part on each training page embedding for an associated page in a plurality of training sequences of pages; and
- determining, by the computing system, the pooled page embedding based at least in part on the machine learning model.

11. A system comprising:
- at least one processor; and
- a memory storing instructions that, when executed by the at least one processor, cause the system to perform:
  - determining page embeddings for pages in a sequence of pages visited by a user;
  - utilizing a machine learning model to generate a pooled page embedding based on the page embeddings for the sequence of pages visited by the user, the machine learning model trained with training data including pages visited in sequence by users during their respective sessions; and
  - determining one or more page recommendations based at least in part on the pooled page embedding.

12. The system of claim 11, further comprising:
- determining a user embedding for the user; and
- wherein the one or more page recommendations are further based at least in part on the user embedding.

13. The system of claim 12, further comprising:
- determining a set of candidate pages based at least in part on the pooled page embedding; and
- ranking the set of candidate pages based at least in part on and the pooled page embedding or the user embedding.

14. The system of claim 13, wherein the determining a set of candidate pages comprises:
- determining a candidate page embedding for each candidate page in the set of candidate pages;
- evaluating a proximity between each candidate page embedding and the pooled page embedding; and
- wherein the determining a set of candidate pages is further based at least in part on whether the candidate page embedding is within a threshold proximity of the pooled page embedding.

15. The system of claim 12, wherein the determining the user embedding is based at least in part on user features associated with the user.

16. A non-transitory computer-readable storage medium including instructions that, when executed by at least one processor of a computing system, cause the computing system to perform a method comprising:
- determining page embeddings for pages in a sequence of pages visited by a user;
- utilizing a machine learning model to generate a pooled page embedding based on the page embeddings for the sequence of pages visited by the user, the machine learning model trained with training data including pages visited in sequence by users during their respective sessions; and
- determining one or more page recommendations based at least in part on the pooled page embedding.

17. The non-transitory computer-readable storage medium of claim 16, further comprising:
- determining a user embedding for the user; and
- wherein the one or more page recommendations are further based at least in part on the user embedding.

18. The non-transitory computer-readable storage medium of claim 17, further comprising:
- determining a set of candidate pages based at least in part on the pooled page embedding; and
- ranking the set of candidate pages based at least in part on and the pooled page embedding or the user embedding.

19. The non-transitory computer-readable storage medium of claim 18, wherein the determining a set of candidate pages comprises:
- determining a candidate page embedding for each candidate page in the set of candidate pages;
- evaluating a proximity between each candidate page embedding and the pooled page embedding; and
- wherein the determining a set of candidate pages is further based at least in part on whether the candidate page embedding is within a threshold proximity of the pooled page embedding.

20. The non-transitory computer-readable storage medium of claim 17, wherein the user embedding is based at least in part on user features associated with the user.

* * * * *